United States Patent
Jin et al.

(10) Patent No.: US 10,594,006 B2
(45) Date of Patent: Mar. 17, 2020

(54) BATTERY COOLING SYSTEM AND METHOD FOR CONTROLLING THE SAME

(71) Applicant: Samsung SDI Co., Ltd., Yongin-si, Gyeonggi-do (KR)

(72) Inventors: Jae Sik Jin, Yongin-si (KR); Sanggyu Kim, Yongin-si (KR); Kichoon Lee, Yongin-si (KR); Jongseop Kwak, Yongin-si (KR); Su-Bin Song, Yongin-si (KR)

(73) Assignee: Samsung SDI Co., Ltd., Gyeonggi-do (KR)

(*) Notice: Subject to any disclaimer, the term of this patent is extended or adjusted under 35 U.S.C. 154(b) by 878 days.

(21) Appl. No.: 15/008,290

(22) Filed: Jan. 27, 2016

(65) Prior Publication Data

US 2016/0226110 A1 Aug. 4, 2016

(30) Foreign Application Priority Data

Jan. 30, 2015 (KR) .................. 10-2015-0015560

(51) Int. Cl.
*H01M 10/635* (2014.01)
*H01M 10/48* (2006.01)
*H01M 10/6563* (2014.01)
*H01M 10/613* (2014.01)
*H01M 10/633* (2014.01)

(52) U.S. Cl.
CPC ....... *H01M 10/635* (2015.04); *H01M 10/486* (2013.01); *H01M 10/613* (2015.04); *H01M 10/633* (2015.04); *H01M 10/6563* (2015.04)

(58) Field of Classification Search
CPC .................. H01M 10/50; B60H 1/32
USPC .......................................... 429/120
See application file for complete search history.

(56) References Cited

U.S. PATENT DOCUMENTS

| 2006/0169507 A1* | 8/2006 | Inoue | B60K 11/02 180/68.4 |
| 2009/0280395 A1* | 11/2009 | Nemesh | B60H 1/00278 429/62 |
| 2009/0321532 A1* | 12/2009 | Maitre | B60H 1/00278 236/91 R |

(Continued)

FOREIGN PATENT DOCUMENTS

| KR | 10-2012-0020504 A | 3/2012 |
| KR | 10-2013-0017286 A | 2/2013 |

(Continued)

*Primary Examiner* — Abdullah A Riyami
*Assistant Examiner* — Nader J Alhawamdeh
(74) *Attorney, Agent, or Firm* — Knobbe Martens Olson & Bear LLP (57) ABSTRACT

A battery cooling system and a method for controlling the same are disclosed. In one aspect, the system includes a cooling fan connected to a battery system and configured to control a flow speed of a coolant to flow into the battery system. A heat exchanger is connected to the cooling fan and configured to lower the temperature of the coolant. A control valve is configured to selectively supply the coolant to one of the heat exchanger and the cooling fan. And a controller is configured to compare a first temperature, which is the temperature of the air of the environment where the battery cooling system is located, with a first reference temperature and control the control valve based on the comparison.

23 Claims, 3 Drawing Sheets

(56) References Cited

U.S. PATENT DOCUMENTS

| | | | | |
|---|---|---|---|---|
| 2013/0017419 A1* | 1/2013 | Jin | ............... | H01M 10/425 |
| | | | | 429/50 |
| 2013/0255603 A1* | 10/2013 | Pursifull | ............ | F01P 11/16 |
| | | | | 123/41.15 |
| 2016/0226110 A1* | 8/2016 | Jin | ............... | H01M 10/635 |

FOREIGN PATENT DOCUMENTS

| KR | 10-2013-0025119 A | 3/2013 |
|---|---|---|
| KR | 10-1278569 B1 | 6/2013 |

* cited by examiner

BATTERY COOLING SYSTEM AND METHOD FOR CONTROLLING THE SAME

RELATED APPLICATIONS

This application claims the benefit of Korean Patent Application No. 10-2015-0015560, filed on Jan. 30, 2015, in the Korean Intellectual Property Office, the disclosure of which is incorporated herein in its entirety by reference.

BACKGROUND

Field

The described technology generally relates to a battery cooling system and method for cooling the same.

Description of the Related Technology

An energy storage system is an apparatus for storing electrical power when demand is low and for consumption of the stored electrical power when the electrical power demand is high, which improves energy efficiency and stability of an electrical power system. Due to its favorable characteristics, there is an increased demand for smart grids and new types of energy as well as effectiveness and stability of electrical power systems.

In an energy storage system having a parallel connection of trays each including one or more batteries, when one of the trays is detached during a charging or discharging process, the energy storage system can break down due to a high current flowing through the remaining trays or a voltage difference between the trays.

An energy storage system can include a number of battery cells that are repeatedly charged and discharged. Accordingly, the battery cells can have low efficiency due to heat generated from the battery cells so that it can be difficult to manage the energy storage system. Therefore, research is being conducted on cooling systems to cool energy storage systems.

SUMMARY OF CERTAIN INVENTIVE ASPECTS

One inventive aspect relates to a battery cooling system and method of controlling the same.

Another aspect is a battery cooling system that uses an external fluid as a cooling fluid to cool a battery system using a cooling fluid and includes a cooling fan connected to the battery system to control a flow speed of the cooling fluid to flow in the battery system, a heat exchanger connected to the cooling fan to lower a temperature of the cooling fluid, a control valve to selectively supply the cooling fluid flowing into the battery cooling system to the heat exchanger and the cooling fan, and a controller to compare a first temperature, which is an external air temperature, with a first reference temperature and to control an opening of the control valve.

In the above system, the controller can move the cooling fluid passing through the control valve to the heat exchanger when the first temperature is equal to or higher than the first reference temperature, and move the cooling fluid passing through the control valve to the cooling fan when the first temperature is lower than the first reference temperature.

In the above system, the controller can compare a second temperature, which is an inside temperature of the battery system, with a second reference temperature, and drive the cooling fan when the second temperature is equal to or higher than the second reference temperature, and stop the driving of the cooling fan when the second temperature is lower than the second reference temperature.

In the above system, the temperature of the cooling fluid passing through the cooling fan can be set to be equal to or lower than the first reference temperature.

In the above system, the cooling fluid is an external air.

Another aspect is a method of controlling a battery cooling system includes a step for detecting a first temperature which is an external air temperature, a step for comparing the first temperature with a first reference temperature in a controller, and a step that the controller transmits a signal to a control valve to control an opening of the control valve such that a flow direction of the cooling fluid is set by the opening of the control valve.

In the above method, the step for setting the flow direction of the cooling fluid can include moving the cooling fluid passing through the control valve to a heat exchanger when the first temperature is equal to or higher than the first reference temperature, and moving the cooling fluid passing through the control valve to a cooling fan when the first temperature is lower than the first reference temperature.

In the above method, the controlling method can further include a step for cooling the battery system by supplying the cooling fluid passing through the cooling fan to the battery system.

In the above method, the controlling method can further include a step for detecting a second temperature which is an inside temperature of the battery system, and a step for comparing the second temperature with a second reference temperature to determine whether to operate the cooling fan.

In the above method, the step for determining whether to operate the cooling fan can include driving the cooling fan when the second temperature is higher than the second reference temperature, and stopping the driving of the cooling fan when the second temperature is lower than the second reference temperature.

In the above method, the cooling fluid passing through the cooling fan is controlled to be lower than the first reference temperature.

Another aspect is a battery cooling system, comprising: a cooling fan connected to a battery system and configured to control a flow speed of a coolant to flow into the battery system; a heat exchanger connected to the cooling fan and configured to lower the temperature of the coolant; a control valve configured to selectively supply the coolant to one of the heat exchanger and the cooling fan; and a controller configured to i) compare a first temperature, which is the temperature of the air of the environment where the battery cooling system is located, with a first reference temperature and ii) control the control valve based on the comparison.

In the above battery cooling system, the controller is further configured to control the control valve to i) supply the coolant to the heat exchanger when the first temperature is equal to or greater than the first reference temperature and ii) supply the coolant to the cooling fan when the first temperature is less than the first reference temperature.

In the above battery cooling system, the controller is further configured to i) compare a second temperature, which is an inside temperature of the battery system, with a second reference temperature ii) drive the cooling fan when the second temperature is equal to or greater than the second reference temperature, and iii) stop the driving of the cooling fan when the second temperature is less than the second reference temperature.

In the above battery cooling system, the controller is further configured to set the temperature of the coolant to pass through the cooling fan to be less than or substantially equal to the first reference temperature.

In the above battery cooling system, the coolant includes air that flows into the battery cooling system from the environment.

The above battery cooling system further comprises a first temperature sensor placed on a cover of the battery cooling system, wherein the first temperature sensor is configured to measure the first temperature and provide the first temperature to the controller.

Another aspect is a method of controlling a battery cooling system, the method comprising: detecting a first temperature which is the temperature of air that flows into the battery cooling system from the environment; comparing the first temperature with a first reference temperature in a controller; and providing a signal to a control valve so as to control a flow direction of the coolant.

In the above method, the providing includes i) moving the coolant passing through the control valve to a heat exchanger when the first temperature is equal to or greater than the first reference temperature and ii) moving the coolant passing through the control valve to a cooling fan when the first temperature is less than the first reference temperature.

The above method further comprises supplying the coolant passing through a cooling fan to a battery system connected to the cooling fan so as to cool the battery system.

The above method further comprises: detecting a second temperature which is an inside temperature of the battery system; and comparing the second temperature with a second reference temperature so as to determine whether to operate the cooling fan.

The above method further comprises measuring the second temperature with a second temperature sensor located inside the battery system.

The above method further comprises: driving the cooling fan when the second temperature is equal to or greater than the second reference temperature; and stopping the driving of the coolant when the second temperature is less than the second reference temperature.

In the above method, the temperature of the coolant passing through the cooling fan is controlled to be less than or substantially equal to the first reference temperature.

The above method further comprises measuring the first temperature with a first temperature sensor located outside the battery cooling system.

Another aspect is a battery cooling system, comprising: a cooling fan connected to a battery system and configured to control a flow speed of a coolant to flow into the battery system; a reservoir configured to store the coolant; first to fourth coolant paths; a control valve configured to receive the coolant from the environment via the first coolant path or from the reservoir; a heat exchanger connected to the cooling fan via the third coolant path and configured to lower the temperature of the coolant, wherein the control valve is further configured to selectively supply the coolant to one of the heat exchanger via the second coolant path and the cooling fan via the fourth coolant path; a controller configured to i) compare a first temperature, which is the temperature of the air of the environment where the battery cooling system is located, with a first reference temperature and ii) control the control valve based on the comparison.

In the above battery cooling system, the controller is further configured to control the control valve to i) supply the coolant to the heat exchanger when the first temperature is equal to or greater than the first reference temperature and ii) supply the coolant to the cooling fan when the first temperature is less than the first reference temperature.

In the above battery cooling system, the controller is further configured to i) compare a second temperature, which is an inside temperature of the battery system, with a second reference temperature ii) drive the cooling fan when the second temperature is equal to or greater than the second reference temperature, and iii) stop the driving of the cooling fan when the second temperature is less than the second reference temperature.

In the above battery cooling system, the controller is further configured to set the temperature of the coolant to pass through the cooling fan to be less than or substantially equal to the first reference temperature.

In the above battery cooling system, the coolant includes air received from the environment.

The above battery cooling system further comprises a first temperature sensor placed on a cover of the battery cooling system, wherein the first temperature sensor is configured to measure the first temperature and provide the first temperature to the controller.

DETAILED DESCRIPTION OF CERTAIN INVENTIVE EMBODIMENTS

Reference will now be made in detail to embodiments, examples of which are illustrated in the accompanying drawings, wherein like reference numbers refer to like elements throughout. In this regards, the present embodiments can have different forms and should not be construed as being limited to the descriptions set forth herein. Accordingly, the exemplary embodiments are merely described below, by referring to the figures, to explain aspects of the described technology. As used herein, the term "and/or" includes any and all combination s of one or more the associated listed items. Expressions such as "at least one of," when preceding a list of elements, modify the entire list of elements and do not modify the individual elements of the list.

In the exemplary embodiments, the terms, such as first, second, etc., should not be limited by their terms, but are used to distinguish one element from other element in the exemplary elements.

In the exemplary embodiments, the singular terms of are intended to include the plural terms as well, unless the context clearly indicates otherwise.

In the exemplary embodiments, the terms of "comprise" or "include" when used in this specification, specify the presence of stated features and characteristics, but not preclude the presence or addition of one or more features and characteristics.

In the exemplary embodiments, when a portion, such as a layer, area, or element, is referred to as being "on" another portion, it can be directly on the other portion or intervening layer, area or elements can be present.

In the drawings, the size and relative sizes of the elements can be reduced or exaggerated for clarity and for the purpose or description. For example, since the size or thickness of each element is illustrated in the drawings for the purpose of description, the described technology is not limited to the drawings illustrating the exemplary embodiments. In this disclosure, the term "substantially" includes the meanings of completely, almost completely or to any significant degree under some applications and in accordance with those skilled in the art. The term "connected" can include an electrical connection.

Figure 1:
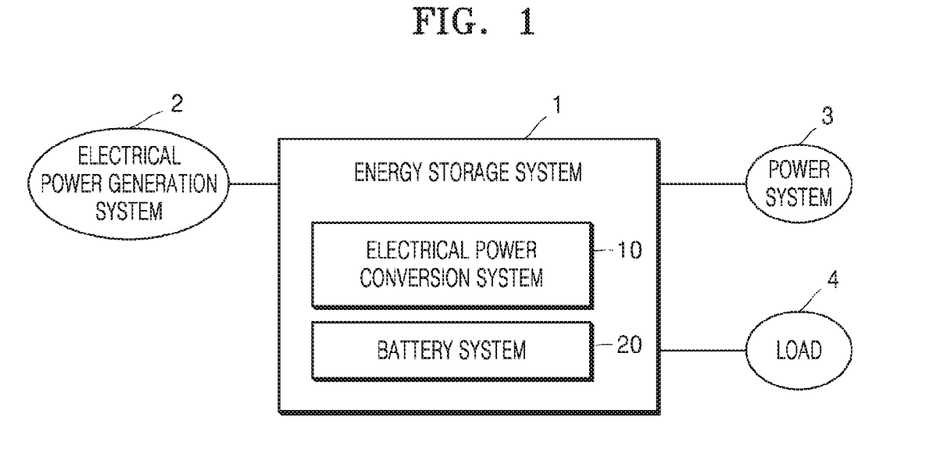
FIG. 1 is a conceptual diagram illustrating an energy storage system and peripherals according to an embodiment.

FIG. 1 is a conceptual diagram illustrating an energy storage system 1 and peripherals thereof according to an embodiment. Depending on the embodiment, certain elements can be removed from or additional elements can be added to the system illustrated in FIG. 1. Furthermore, two or more elements can be combined into a single element, or a single element can be realized as multiple elements. Each of the elements of FIG. 1 can be implemented as a hardware and/or a software module. This applies to FIGS. 2-3.

Referring to FIG. 1, an energy storage system ESS 1 is connected to an electrical power generation system 2 and a power system (or electrical power system) 3 to supply electrical power to a load 4. The energy storage system 1 includes a battery system 20 to store electrical power and an electrical power conversion system (hereinafter, PCS) 10. The PCS can convert electrical power received from the electrical power generation system 2, the power system 3 and/or the battery system 20 into predetermined electrical power and then supply the converted electrical power to the load 4, the battery system 2, and/or the power system 3.

The electrical power generation system 2 is a system to generate an electrical power from an energy source. The electrical power generation system can supply the generated power to the energy storage system 1. The electrical power generation system 2 can be at least one of, for example, a solar light generation system, a wind power generation system, and a tidal power generation system. For example, the electrical power generation system 2 forms a high capacity energy system by arranging a plurality of generating modules in parallel to generate electrical power.

The power system 3 can include an electrical power generator, an electrical transformer, and an electrical power transmission line. When the power system 3 is in a normal state, the power system 3 can supply electrical power to the load 4 and/or the battery system 20 or receive the electrical power from the battery system 2 and/or the electrical power generation system 2. When the power system 3 is in an abnormal state, the electrical power transmission is disconnected between the power system 3 and the energy storage system 1.

The load 4 consumes the electrical power generated from the electrical power generation system 2, stored in the battery system 20, and/or supplied from the power system 3. An example of the load 4 is an electrical apparatus of a house or factory installed with the energy storage system 1.

The energy storage system 1 can store the electrical power generated from the electrical power generation system 2 in the battery system 20 or supply the generated electrical power to the power system 3. The energy storage system 1 can supply the electrical power stored in the battery system 20 to the power system 3 or store the electrical power supplied from the power system 3 in the battery system 20. Also, the energy storage system 1 can supply the electrical power generated from the electrical power generation system 2 or stored in the battery system 2 to the load 4 to function as an uninterruptible power supply (UPS) when the power system 3 is in an abnormal state, for example, in a power outage.

The battery system 20 can include a battery (not shown) including at least one battery cell to store the electrical power and a battery control unit (not shown) to control and protect the battery. The battery can be a battery rack having a plurality of trays to be selectively connected in parallel. The battery can be a tray battery having a plurality of battery cells to be selectively connected in parallel.

The battery control unit is connected to the battery and controls the overall operation of the battery system 20 according to an internal algorithm or a control command. For example, the battery control unit performs an overcharge protection function, an overdischarge protection function, an overcurrent protection function, an overvoltage protection function, a cell balancing function, etc.

The battery control unit can obtain a voltage, a current, a temperature, an amount of a remaining electrical power, a life span, a state of charge (SOC) of the battery. For example, the battery control unit detects a cell voltage, a current, and a temperature of the battery using sensors. The battery control unit can compute the remaining amount of an electrical power, a life span, and a charging state of the battery according to the detected cell voltage, current, and temperature. The battery control unit can manage the battery according to the detected results and the computed results, and can transmit the detected results and the computed results to an integrated controller (not shown). The battery control unit can control charging and discharging operations of the battery according to a charging and discharging control command received from the integral controller.

Figure 2:
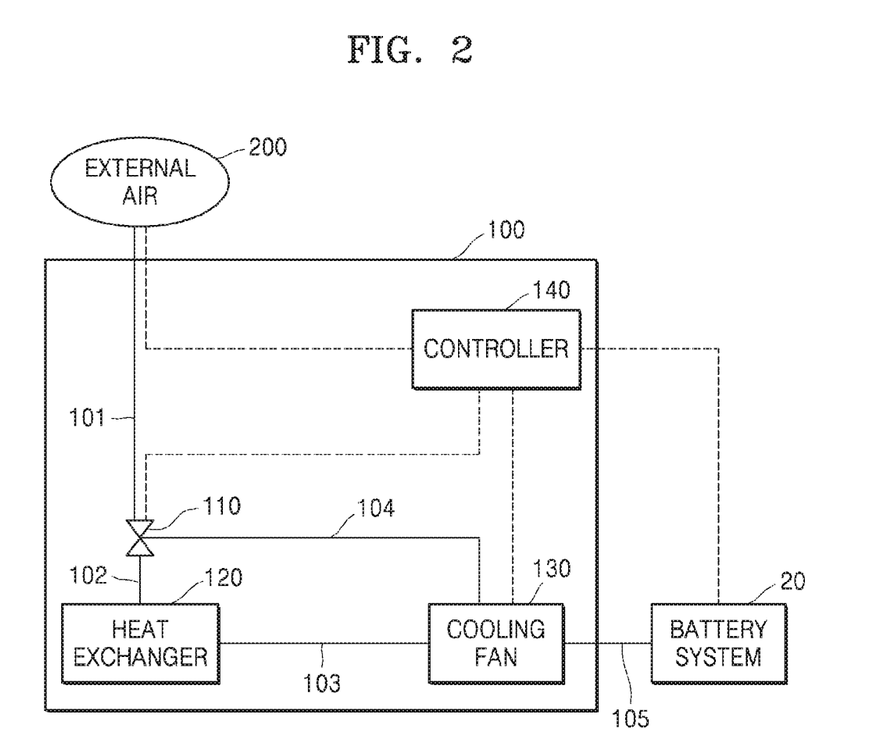
FIG. 2 is a conceptual diagram illustrating a battery cooling system according to an embodiment.
Figure 3:
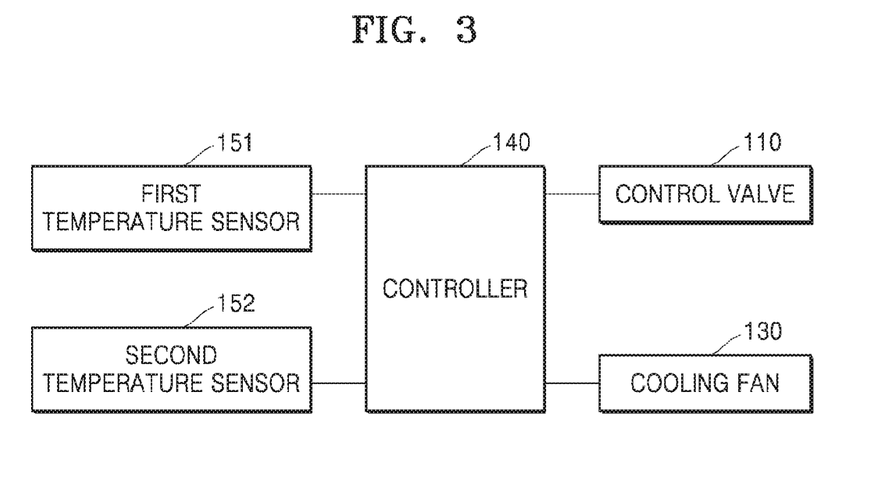
FIG. 3 is a conceptual diagram illustrating a portion of the battery cooling system of FIG. 2.

FIG. 2 is a conceptual diagram illustrating a battery cooling system 100 according to an embodiment. FIG. 3 is a conceptual diagram illustrating a portion of the battery cooling system 100 of FIG. 2.

Referring to FIGS. 2 and 3, the battery cooling system 100 includes first through fifth fluid paths (or first through fifth material paths, or first through fifth coolant paths) 101 through 105, a control valve 110, a heat exchanger 120, a cooling fan 130, a controller 140, a first temperature sensor 151 and a second temperature sensor 152.

The battery cooling system 100 can use an external fluid as a cooling fluid (or cooling material, or coolant) and cool the battery inside the battery system 20 by controlling the cooling fluid to flow through the battery system 20. The battery cooling system 100 can be installed with a reservoir (not shown) to store additional cooling fluid and can be supplied with fluid from the reservoir. Also, the cooling fluid can be external air. That is, the external air around the battery cooling system 100 can be usable as the cooling fluid. For the purpose of explanation, a case where the cooling fluid is outside air of the battery cooling system 100 will be explained hereinafter.

The cooling fluid passes through the first fluid path 101 and can flow into the battery cooling system 100. The first temperature sensor 151 can be disposed on an external side of the battery cooling system 100 (or an outer cover of the battery cooling system 100) to detect a first temperature of the temperature of an external air 200.

The control valve 110 is connected to the first fluid path 101 and controls the cooling fluid flowing from the battery cooling system 100 to selectively flow into the heat exchanger 120 or the cooling fan 130. The control valve 110 can control an opening (opening ratio or open/close degree) thereof to control the cooling fluid passing through the control valve 110 to flow into the heat exchanger 120 or to control the cooling fluid passing through the control valve 110 to flow into the cooling fan 130.

The control valve 110 can be controlled by the controller 140. The control valve 110 can receive a signal from the controller 140 to control the opening of a valve thereof and can set a flow direction of the cooling fluid to the heat exchanger 120 or the cooling fan 130.

The second fluid path 102 can be installed between the control valve 110 and the heat exchanger 120. The cooling fluid flowing into the heat exchanger 120 through the second fluid path 102 is discharged to the third fluid path 103 after a heat exchange with a heat exchange medium of the heat exchanger 120.

The third fluid path 103 is installed between the heat exchanger 120 and the cooling fan 130 to move the cooling fluid being cooled by the heat exchanger 120 to the cooling fan 130. An insulation material is disposed on an outside of the third fluid path 103 to surround the third path 103 to prevent heat from being transferred to the cooling fluid from an outside thereof. The cooling fluid passing through the heat exchanger 120 can be set below the first temperature.

The fourth fluid path 104 is installed between the control valve 110 and the cooling fan 130. The cooling fluid passing through the control valve 110 can flow into the cooling fan 130 through the fourth fluid path 104 (without passing through the heat exchanger 120) and through the fifth fluid path 105.

The cooling fan 130 can control the cooling fluid to flow into the cooling fan 130 through the third fluid path 103 or the fourth fluid path 104 and also to discharge the cooling fluid toward the battery system 20 through the fifth fluid path 105. The cooling fan 130 can control a flow speed of the cooling fluid and effectively remove heat of the battery system 20. The temperature of the cooling fluid discharged from the cooling fan 130 can be set below the first temperature. Since the cooling fluid flowing through the third fluid path 103 is controlled to have a temperature below the first temperature by using the heat exchanger 120, and since the cooling fluid flowing through the fourth fluid path 104 has a temperature below the first temperature according to a temperature of an outside air below the first temperature, the temperature of the cooling fluid is set below the first temperature.

The controller 140 outputs a signal to control the opening of the control valve 110 to the control valve 110 such that the control valve 110 can select a flow direction of the cooling fluid to one of the heat exchanger 120 and the cooling fan 130.

The controller 140 can obtain information on the temperature of the external air 200 as the first temperature from the first temperature sensor 151. The controller 140 can compare the first temperature with the first reference temperature.

The first reference temperature can be changed or set by a user. For example, the first reference temperature is set according to a dimension of the battery system 20, an operation environment, an upper or lower threshold of an inside temperature of the battery system 20, etc. Also, the first reference temperature can be set to a temperature of the cooling fluid to be maintained to cool the battery system 20.

The controller 140 can transmit a signal to the controller valve 110 to control the opening of the control valve 110. When the first temperature is greater than the first reference temperature, the controller controls the opening of the control unit 110 to connect the first fluid path 101 and the second fluid path 102. Here, the cooling fluid can move to the heat exchanger 120 through the control valve 110.

When the first temperature is less than the first reference temperature, the controller 140 controls the opening of the control valve 110 to connect the first fluid path 101 and the fourth fluid path 104. Here, after passing through the control valve 110, the cooling fluid can move directly to the cooling fan 130 without the heat exchange.

The controller 140 can select (or determine) the heat exchange of the cooling fluid according to an external temperature. That is, when a temperature of the external air 200 is low enough to perform the heat exchange with the battery system 20, the external air 200 can be useable as the cooling fluid without any additional cooling of the external air 200, and when the temperature of the external air 200 is high and unsuitable to perform the heat exchange with the battery system 20, the heat exchanger 120 removes heat from the external air 200 to effectively remove the heat of the battery system 20.

The controller 140 can generate and transmit a signal to control an operation of the cooling fan 130.

The second temperature sensor 152 can detect a second temperature of an inside of the battery system 20. The controller 140 can receive information on the second temperature from the second temperature sensor 152 and compare the second temperature with a predetermined temperature which is a second reference temperature. The second reference temperature can be changed or set by a user. For example, the second reference temperature can be set according to a dimension, an operation environment, and an upper or lower threshold of an inside temperature of the battery system 20, a rotation speed of the cooling fan 130, a fluid speed of the cooling fluid passing through the cooling fan 130, etc.

The controller 140 can transmit a signal to the cooling fan 130 to control driving of the cooling fan 130. When the second temperature is greater than the second reference temperature, the controller 140 transmits a signal to the cooling fan 130 to initiate the driving of the cooling fan 130. That is, when an inside temperature of the battery system 20 is greater than the second reference temperature, the cooling fan 130 is driven to increase a flow speed of the cooling fluid to effectively remove the heat from the battery system 20.

When the second temperature is less than the second reference temperature, the controller 140 transmits a signal to the cooling fan 130 to stop the driving of the cooling fan 130. That is, when the inside temperature of the battery system 20 is less than the second reference temperature, the cooling fan 30 can stop the driving to remove the heat of the battery system 20 without increasing the flow speed of the cooling fluid passing through the cooling fan 130 since an amount of heat to be removed from the battery system 20 is small.

Figure 4:
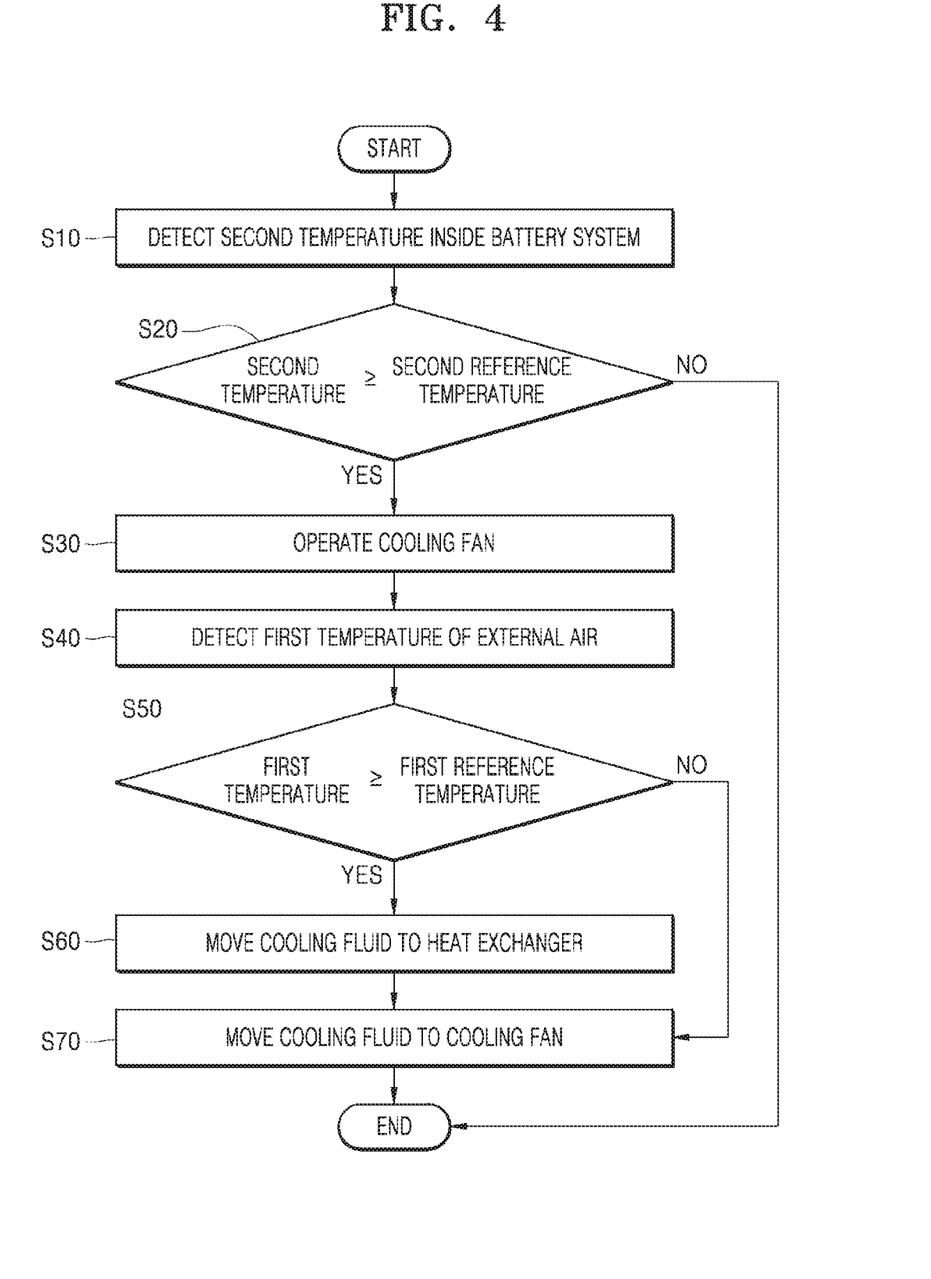
FIG. 4 is a flowchart illustrating a method of controlling the battery cooling system of FIG. 2.

FIG. 4 is a flowchart illustrating a method of controlling the battery cooling system 2 of FIG. 2.

In some embodiments, the FIG. 4 procedure is implemented in a conventional programming language, such as C or C++ or another suitable programming language. The program can be stored on a computer accessible storage medium of the battery cooling system 100, for example, a memory (not shown) of the battery cooling system 100 or the controller 140. In certain embodiments, the storage medium includes a random access memory (RAM), hard disks, floppy disks, digital video devices, compact discs, video discs, and/or other optical storage mediums, etc. The program can be stored in the processor. The processor can have a configuration based on, for example, i) an advanced RISC machine (ARM) microcontroller and ii) Intel Corporation's microprocessors (e.g., the Pentium family microprocessors). In certain embodiments, the processor is implemented with a variety of computer platforms using a single chip or multichip microprocessors, digital signal processors, embedded microprocessors, microcontrollers, etc. In another embodiment, the processor is implemented with a wide range of operating systems such as Unix, Linux, Microsoft DOS, Microsoft Windows 8/7/Vista/2000/9x/ME/XP, Macintosh OS, OS X, OS/2, Android, iOS and the like. In another embodiment, at least part of the procedure can be implemented with embedded software. Depending on the embodiment, additional states can be added, others removed, or the order of the states changed in FIG. 4.

Referring to FIG. 4, the control method of the battery system 20 is explained below.

An inside temperature of the battery system 20 can be detected as a second temperature (S10). The second temperature can be detected by using the second temperature sensor 152 installed inside the battery system 20. The second temperature sensor 152 can convert information on the second temperature into a signal and transmit the signal to the controller 140.

The controller 140 can receive the information on the second temperature and compare the second temperature with a predetermined second reference temperature (S20).

When the second temperature is greater than the second reference temperature, the cooling fan 130 is driven since an amount of heat to be removed from the battery system 20 is great (S30). The controller 140 can transmit a signal to initiate driving of the cooling fan 130 to the cooling fan 130 so that the cooling fan 130 is driven. When the cooling fan 130 is driven, a flow speed of the cooling fluid can be increased to effectively cool the battery system 20.

When the second temperature is less than the second reference temperature, the cooling fluid flows into the battery system 20 without driving the cooling fan 130 to cool the battery of the battery system 20 since an amount of the heat energy to be removed from the battery system 20 is not great.

A temperature of external air can be detected as the first temperature (S40). The first temperature can be detected by using the first temperature sensor 151 installed outside the battery cooling system 100. The first temperature sensor 151 can convert information on the first temperature into a signal and then transmit the signal to the controller 140.

The controller 140 can receive the information on the first temperature and compare the first temperature with a predetermined first reference temperature (S50).

Since external air is used as the cooling fluid, the temperature of the cooling fluid needs to be lowered when the first temperature is greater than the first reference temperature. The controller 140 can transmit a signal to the control valve 110 to control the opening of the control valve 110, and the control valve 110 can connect the first fluid path 101 and the second fluid path 102 to allow the cooling fluid to flow in the heat exchanger 120 (S60).

The heat exchanger 120 can lower the temperature of the cooling fluid. The heat exchanger 120 can control the temperature to be less than the first temperature to effectively cool the battery system 20. After being cooled, the cooling fluid can move to the cooling fan 130 and flow into an inside of the battery system 20 to cool the battery (or batteries) of the battery system 20.

When the first temperature is less than the first reference temperature, it is not necessary to additionally remove heat from the cooling fluid. Since a temperature of the external air is low, the cooling fluid can directly flow into the cooling fan 130. The controller 140 can transmit a signal to the control valve 110 to control the opening of the control valve 110, and the control valve 140 can connect the first fluid path 101 and the fourth fluid path 104 to allow the cooling fluid to flow into the cooling fan 130. Thereafter, the cooling fluid can flow into the battery system 20 through the fifth fluid path 105 to cool the battery system 20 (S70).

The battery cooling system 100 can determine whether to operate the cooling fan 130 by detecting an internal temperature of the battery system 20 and then can determine whether to operate the heat exchanger 120 by detecting an external temperature. Also, the battery cooling system 100 can determine whether to operate the heat exchanger 120 by detecting an external temperature and then can determine whether to operate the cooling fan 130 by detecting an internal temperature of the battery system 20. Moreover, the battery cooling system 100 can substantially simultaneously (or concurrently) determine whether to operate the cooling fan 130 by detecting an internal temperature of the battery system 20 and whether to operate the heat exchanger 120 by detecting an external temperature.

A plurality of batteries can be installed in the battery system 20. Since the efficiency and life span of a battery depend on a temperature, it can be favorable to manage the temperature of the battery to be in a suitable range.

As a method of efficiently removing heat, there can be a method of increasing an amount of heat exchange using the temperature difference by lowering the temperature of the cooling fluid and a method of increasing the amount of heat exchange per hour by increasing a flow speed of the cooling fluid.

According to at least one of the disclosed embodiments, the battery cooling system 100 and a controlling method thereof can efficiently control the flow speed of the cooling fluid by driving the cooling fan 130 and/or can selectively drive the heat exchanger 120 to maintain the temperature of the cooling fluid at a desirable level so that the battery can be efficiently cooled.

The battery cooling system 100 and a controlling method thereof can selectively perform the heat exchange of the cooling fluid in response to an external environment so that responsiveness can be improved and the power consumption amount can be reduced.

The battery cooling system 100 and a method thereof can provide reliability of the battery cooling system 100 by supplying the cooling fluid to the battery system 20 where the fluid has a temperature set to be less than or equal to a predetermined temperature. The battery cooling system 100 and a method thereof can improve durability by minimizing the driving of the cooling fan 130.

The battery cooling system 100 and a controlling method thereof can flexibly respond to temperature fluctuations in the environment and efficiently cool the battery since the cooling fan 130 is selectively driven according to an inside temperature of the battery system 20.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While the inventive technology has been described with reference to the figures, it will be understood by those of ordinary skill in the art that various changes in form and details can be made therein without departing from the spirit and scope of the inventive concept as defined by the following claims.

What is claimed is:

1. A battery cooling system, comprising: a cooling fan connected to a battery system and configured to control a flow speed of a coolant to flow into the battery system; a heat exchanger connected to the cooling fan and configured to lower the temperature of the coolant; a control valve configured to selectively supply the coolant to one of the heat exchanger and the cooling fan; and a controller configured to i) compare a first temperature, which is the temperature of the air of the environment where the battery cooling system is located, with a first predetermined reference temperature and ii) control the control valve based on the comparison; wherein the controller is further configured to i) compare a second temperature, which is an inside temperature of the battery system, with a second predetermined reference temperature ii) drive the cooling fan when the second temperature is equal to or greater than the second reference temperature, and iii) stop the driving of the cooling fan when the second temperature is less than the second reference temperature.

2. The battery cooling system of claim 1, wherein the controller is further configured to control the control valve to i) supply the coolant to the heat exchanger when the first temperature is equal to or greater than the first reference temperature and ii) supply the coolant to the cooling fan when the first temperature is less than the first reference temperature.

3. The battery cooling system of claim 1, wherein the controller is further configured to set the temperature of the coolant to pass through the cooling fan to be less than or substantially equal to the first reference temperature.

4. The battery cooling system of claim 1, wherein the coolant includes air that flows into the battery cooling system from the environment.

5. The battery cooling system of claim 1, further comprising a first temperature sensor placed on a cover of the battery cooling system, wherein the first temperature sensor is configured to measure the first temperature and provide the first temperature to the controller.

6. A method of controlling a battery cooling system, the method comprising: detecting a first temperature which is the temperature of aft of the environment where the battery cooling system is located; comparing the first temperature with a first predetermined reference temperature in a controller; controlling a flow speed of a coolant to flow into a battery system; and providing a signal to a control valve so as to control a flow direction of the coolant; further comprising supplying the coolant passing through a cooling fan to the battery system connected to the cooling fan so as to cool the battery system, wherein the controlling is performed with the cooling fan.

7. The method of claim 6, wherein the providing includes i) moving the coolant passing through the control valve to a heat exchanger when the first temperature is equal to or greater than the first reference temperature and ii) moving the coolant passing through the control valve to a cooling fan when the first temperature is less than the first reference temperature.

8. The method of claim 6, further comprising: detecting a second temperature which is an inside temperature of the battery system; and comparing the second temperature with a second predetermined reference temperature so as to determine whether to operate the cooling fan.

9. The method of claim 8, further comprising measuring the second temperature with a second temperature sensor located inside the battery system.

10. The method of claim 8, further comprising:
driving the cooling fan when the second temperature is equal to or greater than the second reference temperature; and
stopping the driving of the coolant when the second temperature is less than the second reference temperature.

11. The method of claim 6, wherein the temperature of the coolant passing through the cooling fan is controlled to be less than or substantially equal to the first reference temperature.

12. The method of claim 6, further comprising measuring the first temperature with a first temperature sensor located outside the battery cooling system.

13. A battery cooling system, comprising:
a cooling fan connected to a battery system and configured to control a flow speed of a coolant to flow into the battery system;
a reservoir configured to store the coolant;
first to fourth coolant paths;
a control valve configured to receive the coolant from the environment via the first coolant path or from the reservoir;
a heat exchanger connected to the cooling fan via the third coolant path and configured to lower the temperature of the coolant, wherein the control valve is further configured to selectively supply the coolant to one of the heat exchanger via the second coolant path and the cooling fan via the fourth coolant path; and
a controller configured to i) compare a first temperature, which is the temperature of air of the environment where the battery cooling system is located, with a first predetermined reference temperature and ii) control the control valve based on the comparison.

14. The battery cooling system of claim 13, wherein the controller is further configured to control the control valve to i) supply the coolant to the heat exchanger when the first temperature is equal to or greater than the first reference temperature and ii) supply the coolant to the cooling fan when the first temperature is less than the first reference temperature.

15. The battery cooling system of claim 13, wherein the controller is further configured to i) compare a second temperature, which is an inside temperature of the battery system, with a second predetermined reference temperature ii) drive the cooling fan when the second temperature is equal to or greater than the second reference temperature, and iii) stop the driving of the cooling fan when the second temperature is less than the second reference temperature.

16. The battery cooling system of claim 13, wherein the controller is further configured to set the temperature of the coolant to pass through the cooling fan to be less than or substantially equal to the first reference temperature.

17. The battery cooling system of claim 13, wherein the coolant includes air received from the environment.

18. The battery cooling system of claim 13, further comprising a first temperature sensor placed on a cover of the battery cooling system, wherein the first temperature sensor is configured to measure the first temperature and provide the first temperature to the controller.

19. The battery cooling system of claim 1, wherein the first reference temperature is configured to be set according to at least one of a dimension of the battery system, an operation environment, an upper or lower threshold of an inside temperature of the battery system or a temperature of the coolant.

20. The battery cooling system of claim 1, wherein the second reference temperature is configured to be set according to at least one of a dimension, an operation environment, an upper or lower threshold of an inside temperature of the battery system, a rotation speed of the cooling fan or the flow speed of the coolant passing through the cooling fan.

21. The battery cooling system of claim 1, wherein the control valve is further configured to receive the coolant prior to the cooling fan and the heat exchanger receiving the coolant.

22. The battery cooling system of claim 1, wherein the cooling fan is directly connected to the battery system.

23. The battery cooling system of claim 1, wherein the controller is configured to drive the cooling fan to change the flow speed of the coolant to flow into the battery system.

* * * * *